United States Patent [19]

Chainer et al.

[11] Patent Number: 4,939,599
[45] Date of Patent: Jul. 3, 1990

[54] METHOD AND APPARATUS FOR MEASURING DYNAMIC TRACK MISREGISTRATION

[75] Inventors: Timothy J. Chainer; Edward J. Yarmchuk, both of Mahopac, N.Y.

[73] Assignee: International Business Machines Corporation, Armonk, N.Y.

[21] Appl. No.: 158,957

[22] Filed: Feb. 22, 1988

[51] Int. Cl.⁵ .............................................. G11B 33/10
[52] U.S. Cl. ................................. 360/77.03; 324/226
[58] Field of Search .............................. 369/53, 54, 58; 324/207, 226; 360/77.02, 77.03, 77.04, 77.05, 77.06, 77.07, 77.08, 77.11

[56] References Cited

U.S. PATENT DOCUMENTS

| 3,126,535 | 3/1964 | Streeter | 360/77.17 X |
| 3,464,549 | 9/1969 | Armbruster | 209/75 |
| 3,496,344 | 2/1970 | Chope | 235/151.13 |
| 3,711,640 | 1/1973 | Takano et al. | 178/6.6 A |
| 3,863,124 | 1/1975 | Pierce et al. | 318/638 |
| 4,144,578 | 3/1979 | Mueller et al. | 364/575 |
| 4,616,276 | 10/1986 | Workman | 360/77.04 |

OTHER PUBLICATIONS

Prater, "Testing Ball Bearings can Prevent Noise in Head/Disk Assemblies", *Computer Technology Review*, Winter 1984, pp. 65, 68–70.
Klein, "The Asynchronous Runout of Spindles", *Mechanical Signature Analysis*, Machinery Vibration, Flow-Induced Vibration, and Acoustic Noise Analysis-DE-vol. 7, ASME, Sep. 1987, pp. 95–99.
Richter et al., Nonrepeatable Radial and Axial Runout of 5¼" Disk Drive Spindles, IEEE Transactions on Magnetics, vol. 24, No. 6, Nov. 1988.
Shi et al., "Use of Readback Signal Modulation to Measure Head/Disk Spacing Variations in Magnetic Disk Files", The Center for Magnetic Recording Research, I. of CA, San Diego, Tech. Rpt. #11, (1985).

*Primary Examiner*—Steven L. Stephan
*Assistant Examiner*—David L. Robertson
*Attorney, Agent, or Firm*—Marc D. Schechter

[57] ABSTRACT

A method and apparatus for measuring dynamic head and track misregistration in, for example, a magnetic disk file. A reference signal waveform is recorded onto a track on a recording medium. The track has a center line and an off-center line parallel to the center line. The recorded reference signal waveform is read a plurality of times with the transducer centered approximately above the off-center line of the track to produce a plurality of off-track playback signal waveforms. A track misregistration signal waveform is produced by computing the difference between one off-track playback signal waveform and the average off-track playback signal waveform.

31 Claims, 9 Drawing Sheets

METHOD AND APPARATUS FOR MEASURING DYNAMIC TRACK MISREGISTRATION

BACKGROUND OF THE INVENTION

The invention releates to a method and apparatus for measuring the misregistration between a record/playback transducer and an information track on a recording medium. For example, the invention may be used to measure head-track misregistration in a direct access storage device such as a magnetic disk file.

In a magnetic disk file, information is stored on a magnetizable disk along concentric circular tracks. The amount of information whicch can be stored on a disk depends, in part, on the number of tracks on the disk. Therefore, one way to store more data on a disk is to increase the track density.

As adjacent tracks on the magnetizable disk are moved closer together, the record/playback transducer (the record/playback head) must be positioned more precisely over the track of interest in order to avoid cross talk between adjacent tracks. Therefore, it is important to minimize the amount by which the record/playback transducer wanders off of the center of the track. This amount of wandreing is known as track misregistration.

There are many factors which are responsible for head and track misregistration. These factors may be divided into two categories: static and dynamic. Static misregistration includes effects which vary slowly in time, such as thermal drift and disk creep. The static components of head and track misregistration may be removed with modest servo requirements.

Dynamic head and track misregistration includes effects which cause the head to change its position relatively quickly such as in less time than it takes to read or write a single track. Causes of dynamic misregistration include nonrepeatable runout of the disk rotation bearings, external vibrations, mechanical interactions in the disk file, and transient vibrations such as hed settle-out after the head is moved to a new track.

The removable of dynamic components of head and track misregistration by servoing requires wide bandwidth servos which are expensive and difficult to construct. Therefore, disk file designs which minimize dynamic track misregistration components are highly desireable.

While individual components of head and track misregistration may be small, the cumulative effect of all causes of misregistration may be troublesome. Hence, it is desireable to minimize each component of head and track misregistration.

SUMMARY OF THE INVENTION

It is an object of the invention to provide a method and apparatus for measuring dynamic head and track misregistration.

It is another object of the invention to provide a method and apparatus for in situ measurement of head and track misregistration without altering or adding sensors to the disk file.

According to the invention, a method of measuring dynamic track misregistration comprises the step of recording a reference signal waveform onto a track on a recording medium. The track has a center line and an off-center line parallel to the center line.

Next, the method comprises reading the recorded reference signal waveform a plurality of times with the transducer centered approximately above the off-center line of the track to produce a plurality of off-track playback signal waveforms. An average off-track playback signal waveform is produced by averaging a number of off-track playback signal waveforms. The difference between one off-track playback signal waveform and the average off-track playback signal waveform is a track misregistration signal waveform.

Preferably, each n reads of the reference signal waveform produces one off-track playback signal waveform, where n is an integer greater than or equal to 1.

It is also preferred that the recorded reference signal waveform is a radio frequency waveform which is read to produce a read signal waveform. The read signal waveform is rectified and low pass filtered to produce the off-track playback signal waveform.

The method of measuring dynamic track misregistration may further comprise the step of reading the recording reference signal waveform with the transducer centered approximately above the center line of the track to produce an on-track playback signal waveform. The difference between the off-track playback signal waveform and the average off-track playback signal waveform is divided by the on-track playback signal waveform to produce the track misregistration signal waveform.

Alternatively, the difference between the off-track playback signal wavefrom and the average off-track playback signal waveform may be divided by an average of several on-track playback signal waveforms to produce the track misregistration signal waveform.

It is, further, possible to average the average on-track playback signal waveform over the length of the track to produce a track average on-track playback signal waveform. The track average on-track playback signal waveform may then be used in the computation of the track misregistration signal waveform.

During the reading of the recorded reference signal waveform, the transducer defines a read line on the track. The amplitude of the playback signal waveform is a linear function of the distance between the read line and the center line of the track when the read line distance is in a first range. Preferably, the read line distance is in the first range during the step of reading the recorded reference signal waveform to produce the off-track playback signal waveform.

Prefereably, the quotient of the difference signal waveform divided by the track average on-track playback signal waveform is multiplied by the transducer gap width to produce the track misregistration signal waveform.

In another embodiment of the invention, the method further comprises the step of computing the amplitude of at least one frequency component of the track misregistration signal waveform.

In a further aspect of the invention, the method further comprises graphically displaying the amplitudes of frequency components of two track misregistration signal waveforms as a function of the distances of the transducer from the center line of the track.

A root mean square track misregistration signal waveform can be produced, according to the invention, by computing a root mean square waveform of a plurality of track misregistration signal waveforms. Alternatively, a histogram track misregistration signal waveform may be produced by sampling amplitudes of a plurality of track misregistration signal waveforms.

In the method according to the present invention, a real-time track misregistration signal waveform may be produced to study transient phenomena. Such a real-time waveform is produced by subtracting a real-time off-track playback signal waveform from a stored average off-track playback signal waveform to produce the real-time track misregistration signal waveform.

An apparatus for measuring track misregistration according to the present invention comprises means for recording a reference signal waveform onto a track on a recording medium. Means are provided for reading the recorded reference signal waveform a plurality of times with the transducer centered approximately above the off-center line of the track to produce a plurality of off-track playback signal waveforms. The apparatus further includes means for calculating an average off-track playback signal waveform, and means for calculating the difference between one off-track playback signal waveform and the average off-track playback signal waveform to produce a track misregistration signal waveform.

The method and apparatus according to the present invention are advantageous because they can measure dynamic head and track misregistration with great accuracy and precision, without modifying the disk file and during ordinary operation of the disk file. As a result the invention can be used to evaluate new disk file designs or to inspect disk files after production.

DESCRIPTION OF THE PREFERRED EMBODIMENTS

Figure 1:
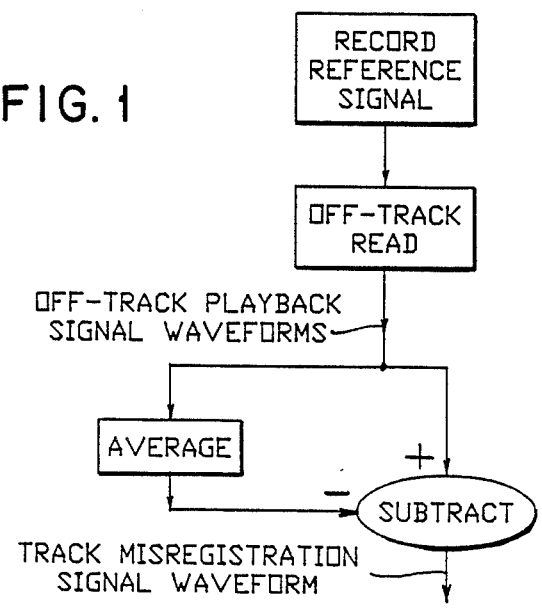
FIG. 1 is a flow chart of the method of measuring dynamic track misregistration according to the present invention.

FIG. 1 is a flow chart of the method according to the present invention for measuring dynamic head and track misregistration. The method starts with recording a reference signal onto a track on a recording medium. The recorded reference signal is then read a plurality of times with the transducer centered approximately above an off-center line of the track to produce a plurality of off-track playback signal waveforms. The off-track playback signal waveforms are averaged. The difference between one off-track playback signal waveform and the average off-track playback signal waveform is a track misregistration signal waveform.

Figure 2:
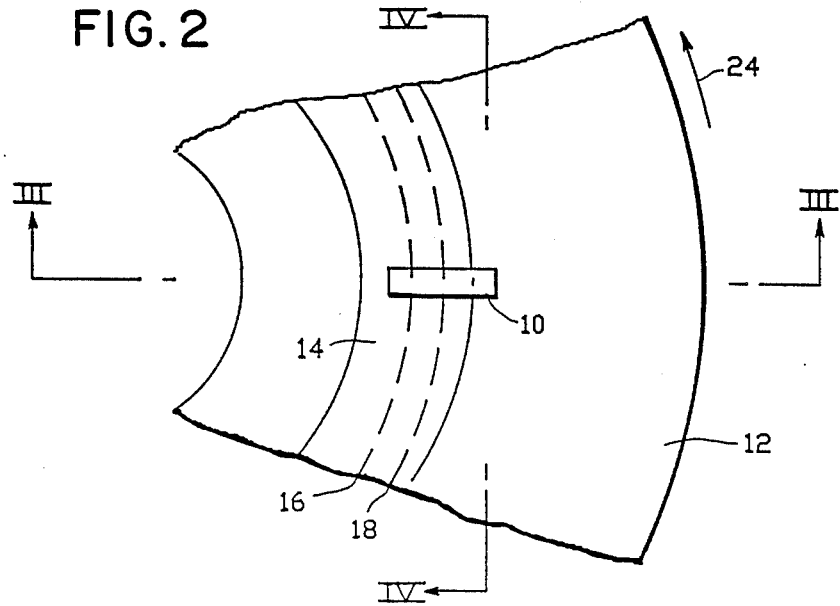
FIG. 2 is a schematic plan view of a transducer and a recording medium illustrating their use in the method according to the present invention.

FIG. 2 schematically shows a transducer 10 and a recording medium 12 for use in the method of measuring dynamic track misregistration. The transducer 10 may be, for example, a magnetic record/playback head. The recording medium 12 may be, for example, a rigid disk bearing a magnetizable layer on the surface thereof.

Still referring to FIG. 2, the disk 12 has a reference signal recorded thereon onto a track 14. Track 14 has a center line 16 running down the center of the track. Track 14 also has a plurality of off-center lines parallel to but spaced from the center line 16. One off-center line 18 is shown in FIG. 2. As further described below, the reference signal may be recorded on track 14 by centering transducer 10 over center line 16, and then energizing the transducer 10 with a radio frequency electric current while rotating the disk 12 in the direction of the arrow 24.

Figure 3:
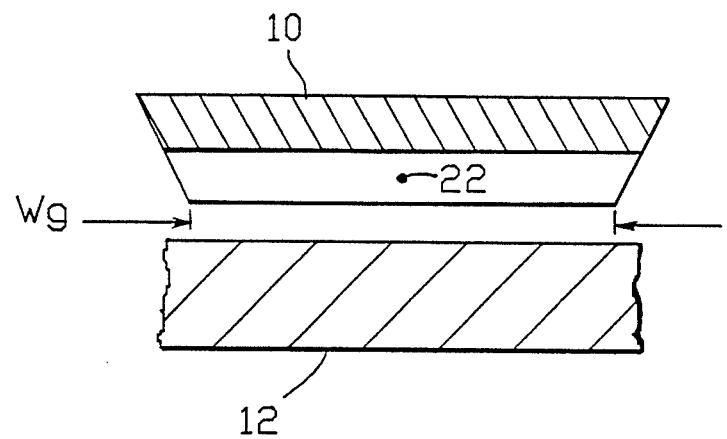
FIG. 3 is a schematic cross-sectional view along line III—III of FIG. 2.
Figure 4:
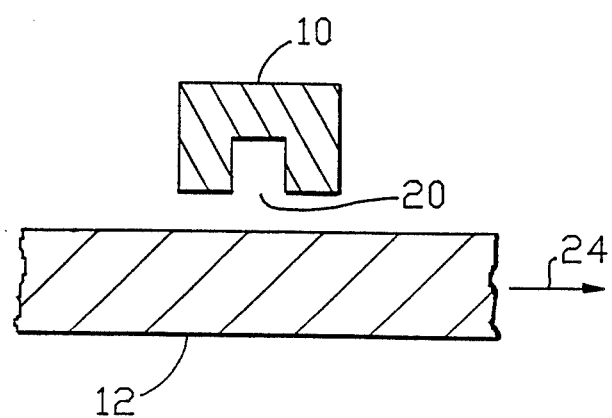
FIG. 4 is a schematic cross-sectional view along line IV—IV of FIG. 2.

FIGS. 3 & 4 show cross-sections through the head 10 and disk 12 of FIG. 2. The head 10 has a gap 20 (FIG. 4) having a width $w_g$ (FIG. 3). The head 10 also has a center 22 (FIG. 3). During the reading of the recorded reference signal waveform, the projection onto the recording medium 12 of the trajectory of the center 22 of the transducer 10 defines a read line on the track 14.

Figure 5:
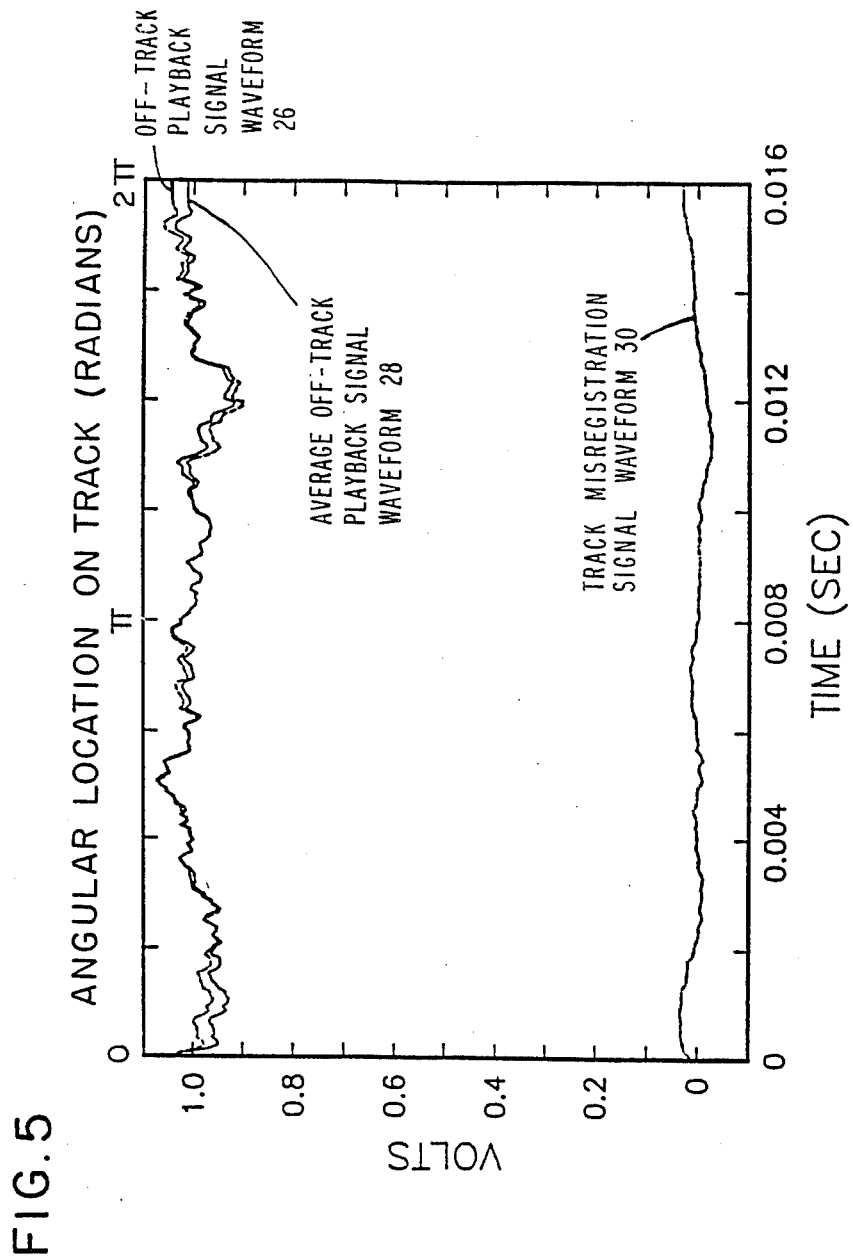
FIG. 5 is a graph showing a number of signal waveforms produced in the method and apparatus according to the present invention.

After the reference signal waveform has been recorded onto track 14 on the recording medium 12, the recorded reference signal waveform is read a plurality of times with the transducer 10 centered approximately above the off-center line 18 of the track 14 to produce a plurality of off-track playback signal waveforms. Curve 26 of FIG. 5 shows one such off-track playback signal waveform produced by reading the recorded reference signal waveform during a single rotation of the disk 12. Curve 28 of FIG. 5 shows an average off-track playback signal waveform produced by averaging a number of off-track playback signal waveforms.

In order to produce the track misregistration signal waveform, the difference between one off-track playback signal waveform and the average off-track playback signal waveform is computed. The difference between the two waveforms is computed point-by-point along the length of the track so as to produce, for example, the curve 30 shown in FIG. 5. Curve 30 was obtained by subtracting curve 28 (the average off-track playback signal) from curve 26 (a single off-track playback signal). Since the track 14 on the disk 12 forms a circle, each point along the length of the track 14 corresponds to an angle of rotation between 0 and $2\pi$.

The measurement of dynamic track misregistration according to the present invention is based upon the observation that the read signal amplitude decreases linearly with increasing off-track position of the record/playback head in certain ranges or regions of off-track position.

Figure 6:
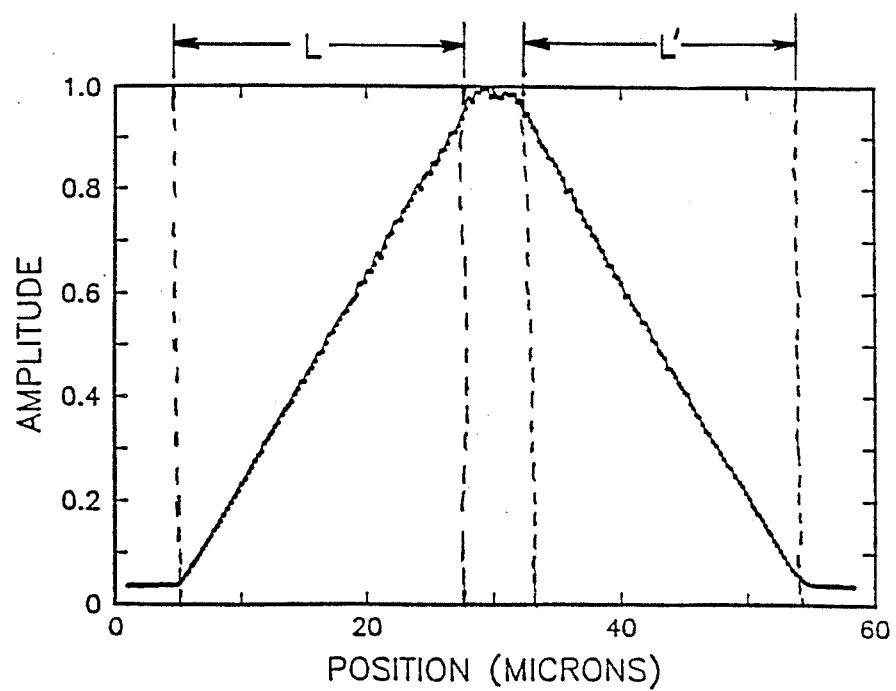
FIG. 6 is a plot of a normalized read signal waveform amplitude versus the radial position of the record/playback transducer in a disk file.

FIG. 6 shows a plot of a normalized read signal amplitude versus the radial position of the head 10 (FIG. 2). The data was taken using a 28 micron wide head. As shown in FIG. 6, with the head 10 centered approximately above the center line of the track at the radial position of 30 microns, the amplitude of the read signal waveform is maximum. As the head 10 moves slightly off of the center line of the track, at first the amplitude of the read signal waveform remains substantially constant. However, as the head moves further off track, the amplitude of the read signal waveform becomes a linear function of the radial position of the head. Finally, when the read line distance approaches the width of the head (which is also the width of the track) the amplitude of the read signal waveform essentially falls to zero.

Thus, in the regions L and L' of FIG. 6, the recording head acts as a displacement transducer whose output signal (the read signal waveform) is highly sensitive to differences in the position between the head and the recorde track. However, since small variations in the amplitude of the read signal waveform can arise from sources other than dynamic head and track misregistration, it is necessary to identify and extract only that portion of the modulation of the amplitude of the read signal waveform which is due to dynamic track misregistration.

A first contribution to modulation of the amplitude of the read signal waveform is frozen-in signal modulation. Frozen-in signal modulation is caused by, for example, media variations, variations in the head to disk spacing during recording of the reference signal waveform onto the track, and any track misregistration which occurs during recording of the reference signal waveform onto the track. All of these contributions to the modulation of the read signal amplitude are part of the recorded reference signal waveform, and are therefore locked to the rotation of the disk 12. Therefore, these amplitude variations are repeatable.

In addition to the frozen-in signal modulation described above, modulation of the amplitude of the read signal waveform may also be caused by nonrepeatable variations in the head to disk spacinng (fly height fluctuations) during the reading of the recorded reference signal, and by electronics noise.

Thus, the read signal amplitude $V(\theta,t)$ can be expressed as follows:

$$V(\theta,t) = V_o(\theta) e^{\frac{-2\pi\delta h(t)}{\lambda}} \left[ 1 - \frac{r(\theta,t)}{w_g} \right] + n(t) \quad (1)$$

In equation (1), $V_o(\theta)$ is the on-track playback signal waveform and includes all "frozen in" signal modulation. That is, $V_o(\theta)$ is the playback signal waveform which would be obtained if the head 10 were positioned exactly at the average on-track position and at a constant fly height. The exponential $$e^{\frac{-2\pi\delta h(t)}{\lambda}}$$

is the signal modulation due to fly height variations, where $\lambda$ is the wavelength of the reference signal written on track 14 of the disk 12, and $\delta h(t)$ is the fly height variation from the mean. The term in square brackets represents the linear dependence of the signal amplitude on the off-track position, where $w_g$ is the width of the gap 20 of the record/playback head 10 (FIGS. 3 and 4), and $r(\theta, t)$ is the off-track position of the head. Finally, $n(t)$ is the electronics noise.

The off-track position $r(\theta, t)$ of the head 10 can be written $$r(\theta, t) = r_o + r_1(\theta) + \delta r(t) \quad (2)$$

The equation (2), $r_o$ is the track misregistration "bias" that is imposed in order to operate in a linear region L or L' of FIG. 6. The term $r_1(\theta)$ represents the written-in track misregistration which occurred during recording of the reference signal waveform onto the track. The term $\delta r(t)$ is the nonrepeatable track misregistration which occurs during readback and is the quantity we wish to measure.

If we expand $r(\theta,t)$, and average $V(\theta, t)$ over time, the mean repeatable off-track signal waveform, $\overline{V}(\theta)$, is $$\overline{V}(\theta) = V_o(\theta) \left[ 1 - \frac{r_o - r_1(\theta)}{w_g} \right] \quad (3)$$

This results from the fact that the average values of $\delta r(t)$, $\delta h(t)$ and $n(t)$ are zero. We have also assmed that $\delta h(t)$ is much less than $\lambda/2\pi$.

Now, by expanding the expoential and keeping only first order terms of small quantities, we obtain $$[V(\theta,t) - \overline{V}(\theta)] \times \frac{w_g}{V_o(\theta)} \approx \delta r(t) + \quad (4)$$

$$\frac{2\pi w_g}{\lambda} \left( 1 - \frac{r_o}{w_g} \right) \delta h(t) - n(t) \frac{w_g}{V_o(\theta)}$$

In equation (4) $V(\theta, t)$ is an off-track playbacck signal waveform, $\overline{V}(\theta)$ is the average off-track playback signal waveform. $w_g$ is the width of the gap 20 of the head 10, and $V_o(\theta)$ is the on-track playback signal waveform. The quantity on the left of equation (4) has units of length and is equal to the actual track misregistration, $\delta r(t)$ plus terms due to fly height variations and electronics noise.

The electronics noise has been found to be typically 50 nanovolts rms in a 3 kilohertz bandwidth for track misregistration signal waveforms of about 50 microvolts rms, resulting in a noise contribution of about one-thousandth of the head gap width. The electronics noise thus determines the precision of the track misregistration measurement. In this example, the measurement precision is 0.1% of the track width.

As can be seen from equation (4) the fly height term of the track misregistration signal waveform depends on both the wavelength of the recorded reference signal on track 14 and the off-track position of the head 10. As a result, the fly height term can be made small relative to the track misregistration term by writing at long wavelengths (for example, 20 microns or greater) and by measuring the track misregistration at large off-track positions (for example, 80% of the track width). Moreover, in many cases very little fluctuation in fly height occurs during the track misregistration measurement.

Figure 7:
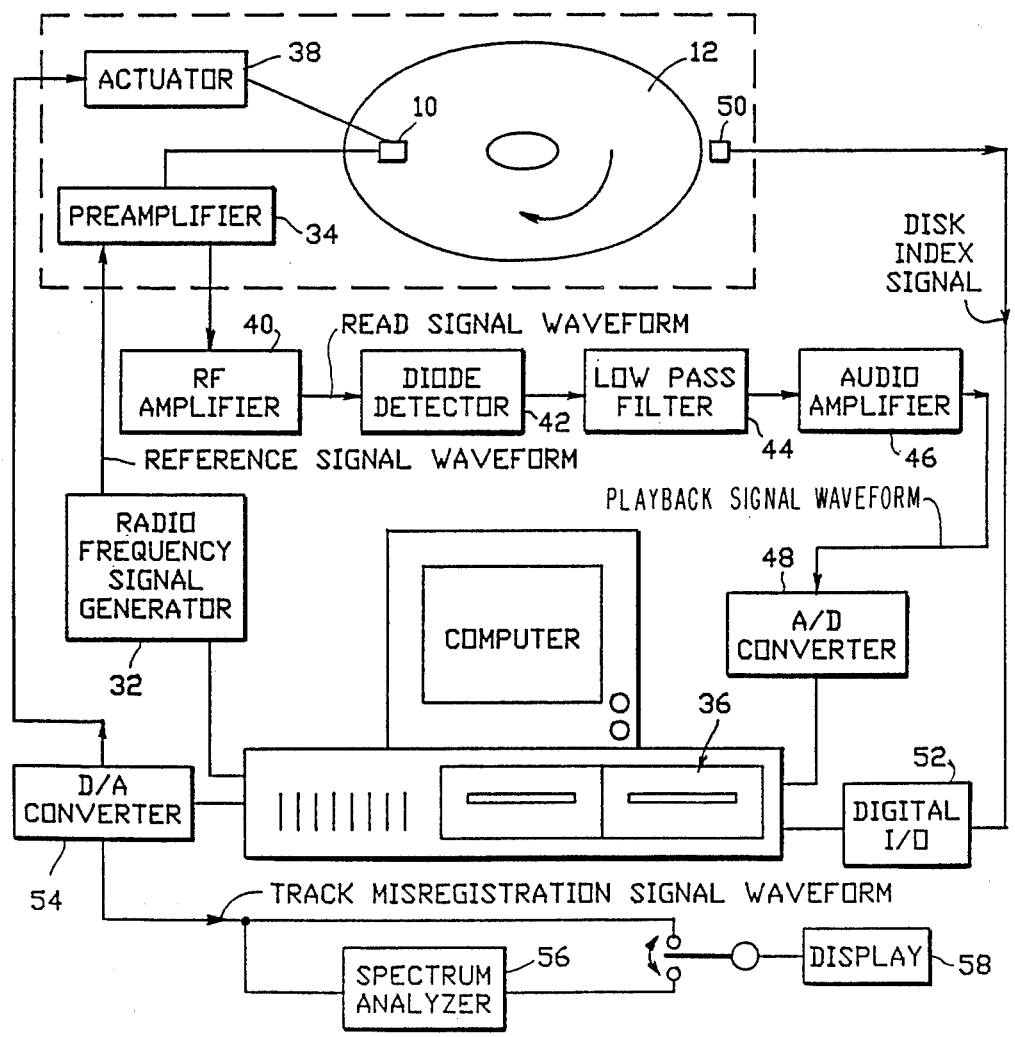
FIG. 7 schematically shows an apparatus according to the present invention for measuring track misregistration.

FIG. 7 shows an example of an apparatus for measuring dynamic track misregistration. The apparatus includes a radio frequency signal generator 32 and a preamplifier 34 for energizing a recording head 10 to record a reference signal waveform onto a track on a rotating recording medium 12. The recording process is controlled by a digital computer 36.

The apparatus further includes means for reading the recorded reference signal waveform with the transducer 10 centered approximately above an off-center line of the track. The reading means includes an actuator 38 controlled by digital computer 36 for positioning the transducer above an off-center line of the track. The recorded reference signal is then read from the rotating disk 12 by recording head 10, whose output is amplified by preamplifier 34 and radio frequency amplifier 40 to produce a read signal waveform. A diode detector 42 rectifies the read signal waveform, and a low pass filter 44 removes the radio frequency component from the read signal waveform. The demodulated read signal waveform is then amplified by amplifier 46 to produce a playback signal waveform (which is here an off-track playback signal waveform because the head 10 is positioned off-track).

The playback signal waveform is digitized using an analog-to-digital converter 48. The analog-to-digital converter 48 may be, for example, a 12 bit converter which samples the analog signal at a rate of 15.58 kilosamples per second.

Waveforms from analog-to-digital converter 48 are captured by digital computer 36 in synchronism with the rotation of disk 12 by triggerng the start of data acquisition when a disk index pulse is received. The disk index pulse is produced by disk index sensor 50 and digital interface 52.

Sensor 50 may be, for example, a stationary Hall-effect probe and a rotating magnet, as typically used in direct current brushless motors used in disk files. The Hall probe generates a signal pulse one time for each rotation of the motor and disk. The digital interface 52 may be, for example, a threshold detector much a Schmidt trigger which generates a square wave pulse in response to the more curved pulse from the Hall probe.

A plurality (for example, 200) of digitized off-track playback signal waveforms are averaged in digital computer 36, and the average off-track playback signal waveform is stored therein. The average off-track playback signal waveform is then subtracted from subsequent off-track playback signal waveforms to produce real-time digitized track misregistration signal waveforms. The digitized track misregistration signal waveforms are converted to analog waveforms by digital-to-analog converter 54.

In order to obtain a track misregistration signal waveform which represents the track misregistration as a percent of the track width, preferably the method and apparatus also read the recorded reference signal waveform with the transducer centered approximately above the center line of the track to produce an on-track playback signal waveform. An on-track playback signal waveform can be generated by moving the recording head 10 to an on-track position via actuator 38 under the control of digital computer 36. The read signal waveform is amplified and demodulated by amplifiers 34, 40, and 46, and by diode 42 and low pass filter 44, to produce an on-track playback signal waveform which is digitized by analog-to-digital converter 48. The digitized on-track playback signal waveform is stored in digital computer 36. The difference between the off-track playback signal waveform and the average off-track playback signal waveform is then divided in computer 36 by the on-track playback signal waveform to produce the track misregistration signal waveform.

Alternatively, a plurality of on-track playback signal waveforms may be averaged to produce an average on-track playback signal waveform. The difference between the off-track playback signal waveform and the average off-track playback signal waveform is then divided by the average on-track playback signal waveform to produce the track misregistration signal waveform.

It has been found, in practice, that the average on-track playback signal waveform has a nearly constant value across the length of the track. Therefore, the average on-track playback signal waveform can be approximated by a track average on-track playback signal waveform by averaging the average on-track playback signal waveform over the length of the track.

The digital computer 36 can easily calculate the track average on-track playback signal, and therefore need store only a single number as the track average on-track playback signal waveform. This approximation reduces the signal storage requirements on digital computer 36.

From equation (4), it can also be seen that a track misregistration signal waveform which represents track misregistration in units of length can be obtained by multiplying the quotient of the difference signal waveform divided by the track average on-track playback signal waveform by the width $w_g$ of the gap 20 of the transducer 10 to produce the track misregistration signal waveform. The gap width can stored as a number in the digital computer 36, and this calculation can also easily be performed therein.

Spectral Analysis

As shown in FIG. 7, in one embodiment of the invention the output of digital-to-analog converter 54 (this output being the track misregistration signal waveform) is passed through a commercially available spectrum analyzer 56 to measure the amplitude of at least one frequency component of the track misregistration signal waveform. The frequency components of the track misregistration signal waveform may be displayed on a display 58 such as an oscilloscope or a plotter.

Alternatively, in place of spectrum analyzer 56, digital computer 36 can be programmed to calculate a fast fourier transform of the track misregistration signal to measure the amplitude of at least one frequency component of the track misregistration signal waveform.

Figure 8A:
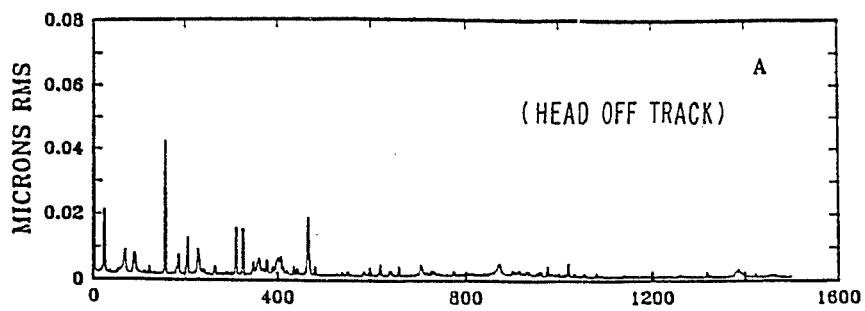
FIGS. 8A and 8B show two plots of the amplitudes of frequency components of the track misregistration signal waveform as a function of the frequency.
Figure 8B:
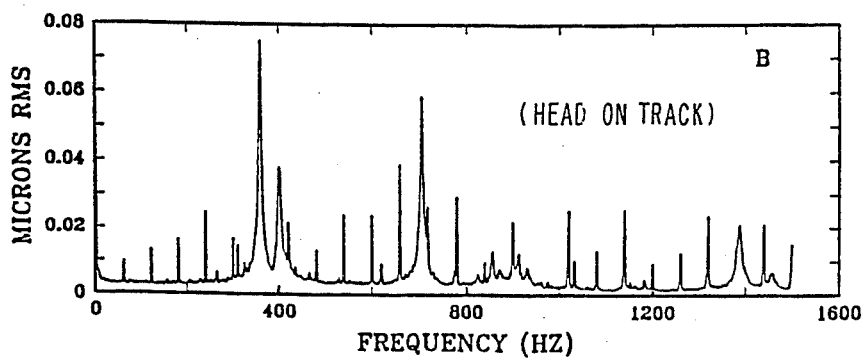

FIGS. 8A and 8B show two plots of the amplitudes of frequency components of a track misregistration signal waveform versus the frequency of the component. FIG 8A was obtained with the head 10 located far off track where sensitivity to track misregistration is high, and where the effects of fly height fluctuations are small. FIG. 8B was taken with the head directly on track where sensitivity to track misregistration is nearly zero, and where fly height fluctuations dominate the signal. The electronics noise was $7.6 \times 10^{-4}$ microns rms in each of the 2.5 Hz steps in the spectra. (Over the entire 3 kilohertz bandwidth of interest, the electronics noise was approximately 0.026 microns rms, or approximately 0.1 percent of the 28 micron width of the gap 20 of head 10.)

The two spectra shown in FIGS. 8A and 8B are almost entirely different, which indicates that the mechanisms responsible for fly height fluctuations are different than the mechanisms responsible for track misregistration in the tested disk file.

Figure 9A:
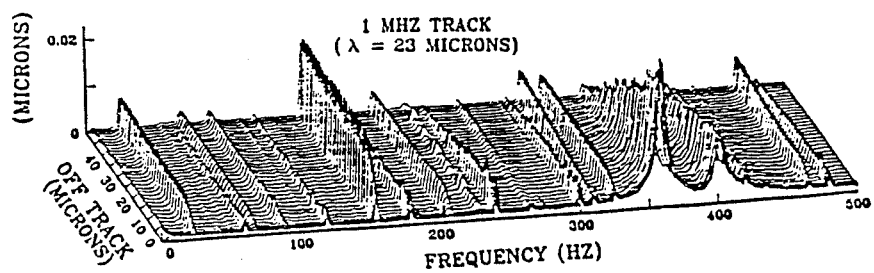
FIGS. 9A, 9B, and 9C show three plots of the amplitudes of frequency components of the track misregistration signal waveform as function of the frequency and as a function of the read line distance.
Figure 9B:
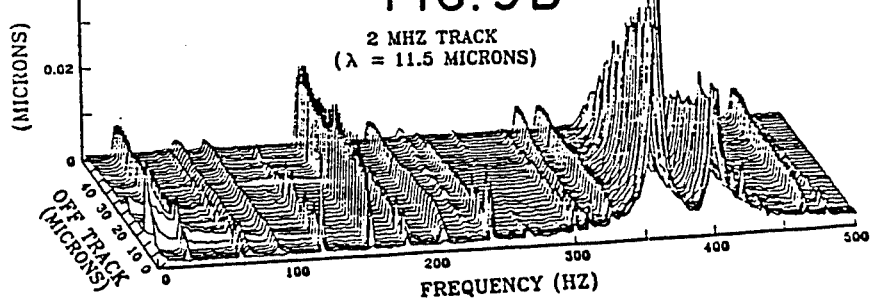
Figure 9C:
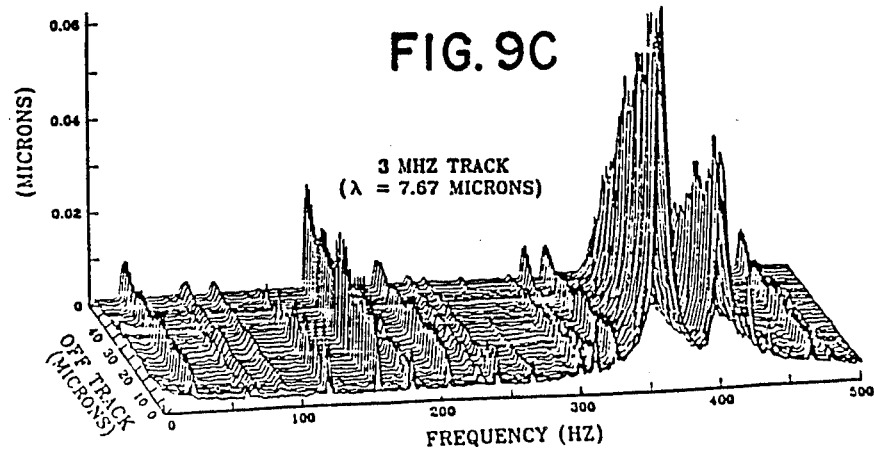

FIGS. 9A, 9B, and 9C show three plots of the amplitudes of frequency components of the track misregistration signal waveform versus the off-track position of the head 10, and versus the frequency of the component of the track misregistration signal waveform. The plots are made at three different wavelengths of the recorded reference signal waveform.

FIGS. 9A, 9B, and 9C, it can be seen that the peaks at 22.5 and 155 hertz rise up from near zero on-track to a constant value when the head is off-track. Equation (4) predicts such behavior for track misregistration peaks, therefore it can be concluded that these peaks are caused by track misregistration.

It can also be seen that peaks at 360 and 400 hertz decrease linearly with off-track position and inversely to the wavelength of the recorded reference signal waveform. Equation (4) predicts such behavior for peaks which are related to fly height fluctuations.

Figure 10:
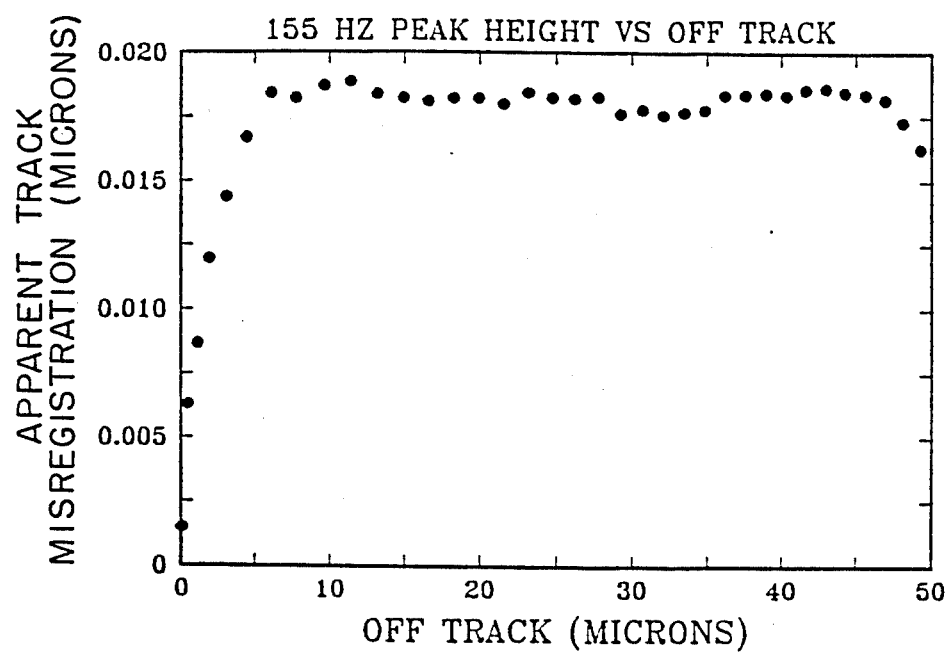
FIGS. 10 & 11 show plots of the amplitudes of single frequency components of the track misregistration signal waveform as a function of the read line distance.

FIG. 10 is a more detailed view of the 155 hertz spectrum of FIGS. 9A, 9B, and 9C for the 1 MHz recorded reference signal waveform. The rise from near zero when the head is on-track to a constant value when the head is off-track is clearly seen in FIG. 10.

Figure 11:
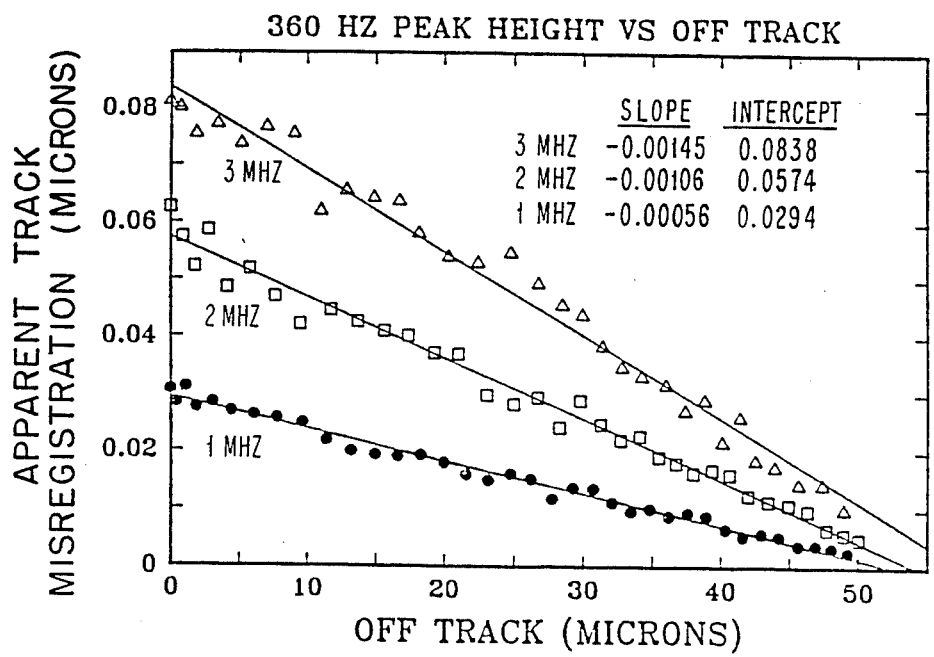

FIG. 11 is a more detailed plot of the 360 hertz spectra of FIGS. 9A, 9B, and 9C. The linear decrease with off-track position and the inverse relationship to the wavelength of the recorded reference signal waveform are clearly seen in FIG. 11.

RMS Analysis

Figure 12:
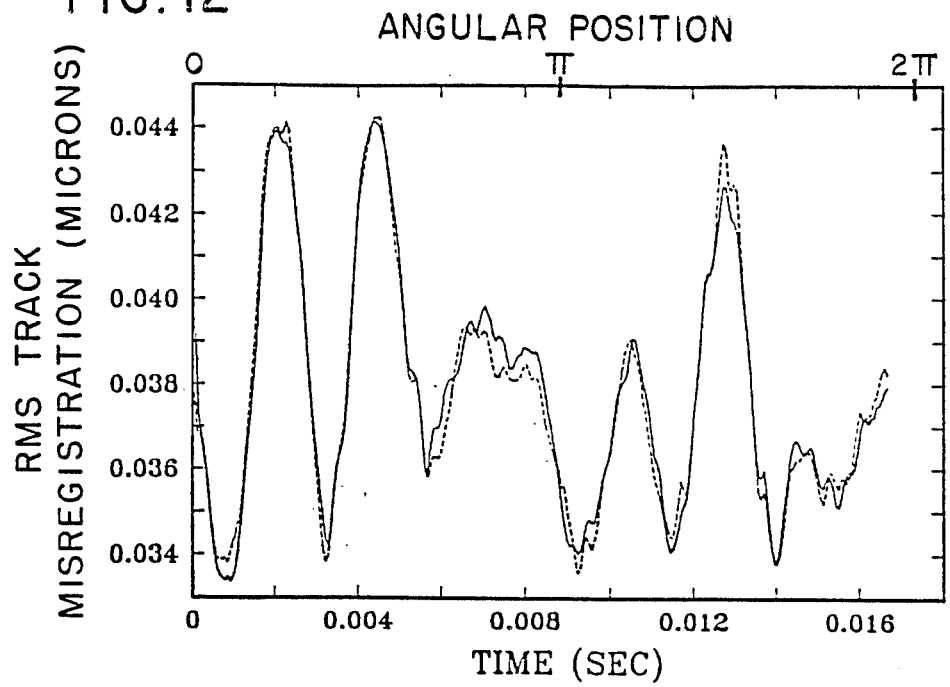
FIG. 12 is a plot of a root mean square track misregistration signal waveform.

FIG. 12 is a pot of a root means square (rms) track misregistration signal waveform. The time scale represents the time after the disk index pulse. The time therefore also corresponds to the angular position of the disk or the angular location on the track. The rms value of the track misregistration was separately calculated by digital computer 36 for each of 258 digitizer time points making up each disk rotation. The solid and dashed lines are for two separate runs. Each run includes data for 10,000 disk rotations.

As seen in FIG. 12, the rms track misregistration is dependent on the angular position of the disk in the disk file tested.

Histogram Analysis

A histogram track misregistration signal waveform was obtained by sampling a track misregistration signal waveform at a rate of 3 kilohertz. The data was obtained for 50,000 disk rotations. The head was located far off-track, and the frequency of the recorded reference signal waveform was 1 megahertz. Consequently, the contribution from fly height fluctuations was minimal. The numbers of counts at each value of sampled track misregistration were tallied by digital computer 36. The disk file was isolated from the lab bench by a foam pad.

Figure 13:
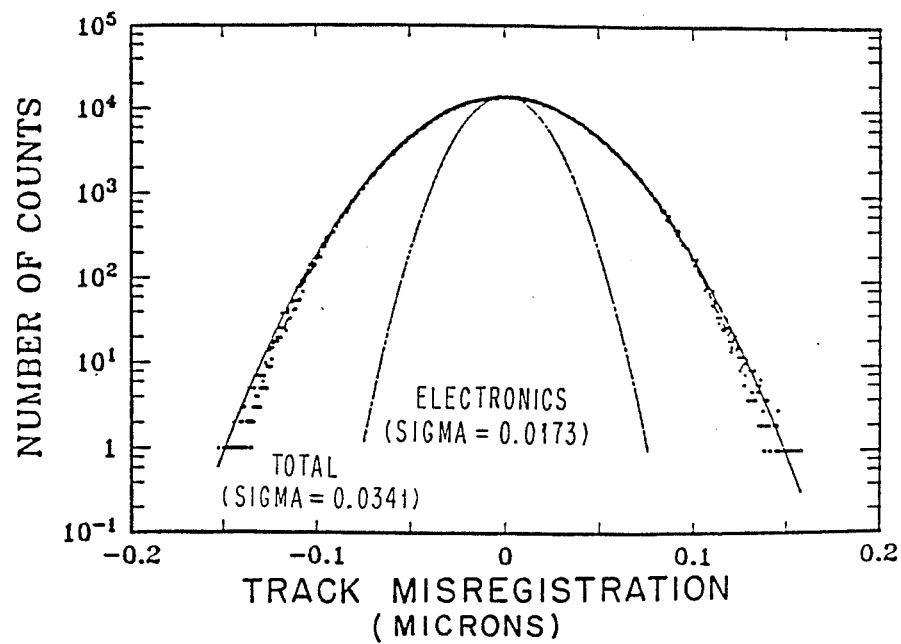
FIG. 13 is a plot of a histogram track misregistration signal waveform.

The histogram is shown in FIG. 13 by scattered data points. The solid line is a Gaussian distribution having the same standard deviation as the data points. The dashed line is to distribution for purely electronic noise. The Gaussian distribution is in excellent agreement with the measurements out to more than four standard deviations.

What is claimed is:

1. A method of measuring dynamic track misregistration in a record/playback device, said device comprising a transducer and a recording medium, said method comprising the steps of:
    recording a reference signal waveform onto a track on the recording medium, said track having a center line and an off-center line parallel to the center line;
    reading the recorded reference signal waveform a plurality of times with the transducer centered approximately above the off-center line of the track to produce a plurality of off-track playback signal waveforms;
    averaging a number of off-track playback signal waveforms to produce an average off-track playback signal waveform; and
    calculating the difference between one off-track playback signal waveform and the average off-track playback signal waveform to produce a track misregistration signal waveform.

2. A method as claimed in claim 1, characterized in that:
    each n reads of the reference signal waveform produces one off-track playback signal waveform, where n is an integer greater than or equal to one;
    the recorded reference signal waveform is a radio frequency waveform; and
    the step of reading the recorded reference signal waveform comprises:
        reading the recorded reference signal waveform to produce a read signal waveform; and
        rectifying and low pass filtering the read signal waveform to produce the off-track playback signal waveform.

3. A method as claimed in claim 2, further comprising the steps of:
    reading the recorded reference signal waveform with the transducer centered approximately above the center line of the track to produce an on-track playback signal waveform; and
    dividing the difference between the off-track playback signal waveform and the average off-track playback signal waveform by the on-track playback signal waveform to produce the track misregistration signal waveform.

4. A method as claimed in claim 3, characterized in that:
    during the steps of reading the recorded reference signal waveform, the transducer defines a read line on the track, said read line being formed by the projection onto the recording medium of the trajectory of the center of the transducer;
    the amplitude of the playback signal waveform is a function of the distance between the read line and the center line of the track, the amplitude being a linear function of the read line distance when the read line distance is in a first range, the slope of the amplitude with respect to the read line distance being maximum when the read line distance is in the first range; and
    during the step of reading the recorded reference signal waveform to produce the off-track playback signal waveform, the read line distance is in the first range.

5. A method as claimed in claim 4, characterized in that:
    the step of reading the recorded reference signal waveform with the transducer centered approximately above the center line of the track comprises reading the recorded reference signal waveform a plurality of times with the transducer centered approximately above the center line of the track to produce a plurality of on-track playback sugnal waveforms;
    the method further comprises the step of averaging a number of on-track playback signal waveforms to produce an average on-track playback signal waveform; and the method further comprises the step of dividing the difference between the off-track playback signal waveform and the average off-track playback signal waveform by the average on-track playback signal waveform to produce the track misregistration signal waveform.

6. A method as claimed in claim 5, characterized in that the method further comprises the steps of:

averaging the average on-track playback signal waveform over the length of the track to produce a track average on-track playback signal waveform; and dividing the difference between the off-track playback signal waveform and the average off-track playback signal waveform by the track average on-track playback signal waveform to produce the track misregistration signal waveform.

7. A method as claimed in claim 6, characerized in that:

the transducer has a transducing gap with a width; and the method further comprises the step of multiplying the quotient of the difference between the off-track playback signal waveform and the average off-track playback signal waveform divided by the track average on-track playback signal wavform by the transducer gap width to produce the track misregistration signal waveform.

8. A method as claimed in claim 7, characterized in that:

the track has a width; and the read line of the track is spaced from the center line of the track by a distance greater than approximately ten percent of the width of the track.

9. A method as claimed in claim 8, characterized in that the read line of the track is spaced from the center line of the track by a distance greater than approximately eighty percent of the width of the track.

10. A method as claimed in claim 9, characterized in that the reference signal waveform has a wavelength which is greater than the width of the track.

11. A method as claimed in claim 2, characterized in that:

the track misregistration signal waveform comprises a number of signal component waveforms having different frequencies; and the method further comprises the step of measuring the amplitude of at least one frequency component of the track misregistration signal waveform.

12. A method as claimed in claim 11, further comprising the steps of:

reading the recorded reference signal waveform with the transducer centered approximately above the center line of the track to produce an on-track playback signal waveform; and dividing the difference between the off-track playback signal waveform and the average off-track playback signal waveform by the on-track playback signal waveform to produce the track misregistration signal waveform.

13. A method as claimed in claim 12, characterized in that:

during the step of reading the recorded reference signal waveform, the transducer defines a read line on the track, said read line being formed by the projection onto the recording medium of the trajectory of the center of the transducer;

the amplitude of the playback signal waveform is a function of the distance between the read line and the center line of the track, the amplitude being a linear function of the read line distance when the read line distance is in a first range, the slope of the amplitude with respect to the read line distance being maximum when the read line distance is in the first range; and during the step of reading the recorded reference signal waveform to produce the off-track playback signal waveform, the read line distance is in the first range.

14. A method as claimed in claim 13, characterized in that:

the step of reading the recorded reference signal waveform with the transducer centered approximately above the center line of the track comprises reading the recorded reference signal waveform a plurality of times with the tranducer centered approximately above the center line of the track to produce a plurality of on-track playback signal waveforms;

the method further comprises the step of averaging a number of on-track playback signal waveforms to produce an average on-track playback signal waveform; and the method further comprises the step of dividing the difference between the off-track playback signal waveform and the average off-track playback signal waveform by the average on-track playback signal waveform to produce the track misregistration signal waveform.

15. A method as claimed in claim 14 characterized in that the method further comprises the steps of:

averaging the average on-track playback signal waveform over the length of the track to produce a track average on-track playback signal waveform; and dividing the difference between the off-track playback signal waveform and the average off-track playback signal waveform by the track average on-track playback signal waveform to produce a track misregistration signal waveform.

16. A method as claimed in claim 15, characterized in that:

the transducer has a transducing gap with a width; and the method further comprises the step of multiplying the quotient of the difference between the off-track playback signal waveform and the average off-track playback signal waveform divided by the track average on-track playback signal waveform by the transducer gap width to produce the track misregistration signal waveform.

17. A method as claimed in claim 2, characterized in that:

the track misregistration signal waveform comprises a number of signal component waveforms having different frequencies;

the track has first and second off-center lines parallel to the center line, said first off-center line being spaced from the center line by a first distance, said second off-center line being spaced from the center line by a second distance different from the first distance; and the method further comprises the steps of:

reading the recorded reference signal waveform a plurality of times with the transducer centered above the first off-center line of the track to produce a plurality of first off-track playback signal waveforms;

reading the recorded reference signal waveform a plurality of times with the transducer centered above the second off-center line of the track to produce a plurality of second off-track playback signal waveforms;

averaging a number of first off-track playback signal waveforms to produce a first average off-track playback signal waveform;

averaging a number of second off-track playback signal waveforms to produce a second average off-track playback signal waveform;

calculating the difference between one first off-track playback signal waveform and the first average off-track playback signal waveform to produce a first difference signal waveform;

calculating the difference between one second off-track playback signal waveform and the second averate off-track playback signal waveform to produce a second difference signal waveform;

dividing the first difference signal waveform by the on-track playback signal waveform to produce a first track misregistration signal waveform;

dividing the second difference signal waveform by the on-track playback signal waveform to produce a second track misregistration signal waveform;

measuring the amplitude of a component of the first track misregistration signal waveform at a first frequency;

measuring the amplitude of a component of the second track misregistration signal waveform at the first frequency; and graphically displaying the amplitudes of the components of the first and second track misregistration signal waveforms as a function of the distances of the first and second off-center lines from the center line.

18. A method as claimed in claim 2, further comprising the steps of:

calculating the differences between a plurality of off-track playback signal waveforms and the average off-track playback signal waveform to produce a plurality of track misregistration signal waveforms; and calculating a root mean square waveform of the track misregistration signal waveforms to produce a root mean square track misregistration signal waveform.

19. A method as claimed in claim 18, characterized in that:

each track misregistration signal waveform has an amplitude which varies as a function of time, each time corresponding to a position along the lenght of the track; and the step of calculating a root mean square of the track misregistration signal waveforms comprises the steps of:

sampling the amplitude of each track misregistration signal waveform a plurality of times during each read of the recorded reference signal, each sample amplitude corresponding to a position along the length of the track; and calculating a root mean square of at least some of the samples.

20. A method as claimed in claim 19, characterized in that:

all sampled amplitudes corresponding to the same position along the length of the track belong to a set corresponding to that position; and the method further comprises the step of calculating a separate root mean square value of the sampled amplitudes for each set.

21. A method as claimed in claim 2, further comprising the steps of:

calculating the differences between a plurality of off-track playback signal waveforms and the average off-track playback signal waveform to produce a plurality of track misregistration signal waveforms, each track misregistration signal waveform having an amplitude which varies as a function of time;

samplying the amplitude of each track misregistration signal waveform a plurality of times during each read of the recorded reference signal; and calculating a histogram of the sampled amplitudes to produce a histogram track misregistration signal waveform.

22. A method as claimed in claim 2, characterized in that the step of calculating the difference between one off-track playback signal waveform and the average off-track playback signal waveform comprises the steps of:

storing the average off-track playback signal waveform to produce a stored average off-track playback signal waveform, said stored average off-track playback signal waveform comprising a plurality of segments, each seqment corresponding to a position along the length of the track;

reading the recorded reference signal waveform with the transducer centered approximately above the off-center line of the track to produce an off-track playback signal waveform;

successively sampling the amplitude of the off-track playback signal waveform in real time, each real-time sample amplitude corresponding to a position along the length of the track; and successively calculating the difference between each real-time sample amplitude and the segment of the stored average off-track playback signal waveform at a corresponding position along the length of the track to produce a real-time track misregistratioin signal waveform.

23. An apparatus for measuring dynamic track misregistration in a record/playback device, said device comprising a transducer and a recording medium, said apparatus comprising:

means for recording a reference signal waveform onto a track on the recording medium, said track having a center line and an off-center line parallel to the center line;

means for reading the recorded reference signal waveform a plurality of times with the transducer centered approximately above the off-center line of the track to produce a plurality of off-track playback signal waveforms;

means for averaging a number of off-track playback signal waveforms to produce an average off-track playback signal waveform; and means for calculating the difference between one off-track playback signal waveform and the average off-track playback signal waveform to produce a track misregistration signal waveform.

24. An apparatus as claimed in claim 23, characterized in that:
each n reads of the reference signal waveform produces one off-track playback signal waveform, where n is an integer greater than or equal to one;
the recorded reference signal waveform is a radio frequency waveform; and
the means for reading the recorded reference signal waveform comprises:
means for reading the recorded reference signal waveform to produce a read signal waveform; and
means for rectifying and low pass filtering the read signal waveform to produce the off-track playback signal waveform.

25. An apparatus as claimed in claim 24, further comprising
means for reading the recorded reference signal waveform with the transducer centered approximately above the center line of the track to produce an on-track playback signal waveform; and
means for dividing the difference between the off-track playback signal waveform and the average off-track playback signal waveform by the on-track playback signal waveform to produce the track misregistration signal waveform.

26. An apparatus as claimed in claim 25, characterized in that:
during the reading of the recorded reference signal waveform, the transducer defines a read line on the track, said read line being formed by the projection onto the recording medium of the trajectory of the center of the transducer;
the amplitude of the playback signal waveform is a function of the distance between the read line and the center line of the track, the amplitude being a linear function of the read line distance when the read line distance is in a first range, the slope of the amplitude with respect to the read line distance being maximum when the read line distance is in the first range; and
the means for reading the recorded reference signal waveform to produce the off-track playback signal waveform comprises means for setting the read line distance in the first range during reading of the recorded reference signal waveform to produce the off-track playback signal waveform.

27. An apparatus as claimed in claim 26, characterized in that:
the means for reading the recorded reference signal waveform with the transducer centered approximately above the center line of the track comprises means for reading the recorded reference signal waveform a plurality of times with the transducer centered approximately above the center line of the track to produce a plurality of on-track playback signal waveforms;
the apparatus further comprises means for averaging a number of on-track playback signal waveforms to produce an average on-track playback signal waveform; and
the apparatus further comprises means for dividing the difference between the off-track playback signal waveform and the average off-track playback signal waveform by the average on-track playback signal waveform to produce the track misregistration signal waveform.

28. An apparatus as claimed in claim 27, characterized in that the apparatus further comprises:
means for averaging the average on-track playback signal waveform over the length of the track to produce a track average on-track playback signal waveform; and
means for dividing the difference between the off-track playback signal waveform and the average off-track playback signal waveform by the track average on-track playback signal waveform to produce the track misregistration signal waveform;

29. An apparatus as claimed in claim 28, characterized in that:
the transducer has a transducing gap with a width; and
the apparatus further comprises means for multiplying the quotient of the difference between the off-track playback signal waveform and the average off-track playback signal waveform divided by the average on-track playback signal waveform by the transducer gap width to produce the track misregistration signal waveform.

30. An apparatus as claimed in claim 24, characterized in that:
the track misregistration signal waveform comprises a number of signal component waveforms having different frequencies; and
the apparatus further comprises means for measuring the amplitude of at least one frequency component of the track misregistration signal waveform.

31. An apparatus as claimed in claim 30, characterized in that:
the track has first and second off-center lines parallel to the center line, said first off-center line being spaced from the center line by a first distance, said second off-center line being spaced from the center line by a second distance different from the first distance; and
the apparatus further comprises:
means for reading the recorded reference signal waveform a plurality of times with the transducer centered above the first off-center line of the track to produce a plurality of first off-strack playback signal waveforms;
means for reading the recorded reference signal waveform a plurality of times with the transducer centered above the second off-center line of the track to produce a plurality of second off-track playback signal waveforms;
means for averaging a number of first off-track playback signal waveforms to produce a first average off-track playback waveform;
means for averaging a number of second off-track playback signal waveforms to produce a second average off-track playback signal waveform;
means for calculating the difference between one first off-track playback signal waveform and the first average off-track playback signal waveform to produce a first difference signal waveform;
means for computing the difference between one second off-track playback signal waveform and the second average off-track playback signal waveform to produce a second difference signal waveform;
means for dividing the first difference signal waveform by the on-track playback signal waveform to produce a first track misregistration signal waveform;

means for dividing the second difference signal waveform by the on-track playback signal waveform to produce a second track misregistration signal waveform;

means for calculating the amplitude of a component of the first track misregistration signal waveform at a first frequency;

means for calculating the amplitude of a component of the second track misregistration signal waveform at the first frequency; and means for graphically displaying the amplitudes of the components of the first and second track misregistration signal waveforms as a function of the distances of the first and second off-center lines from the center line.

* * * * *